2 Sheets—Sheet 1.

W. P. KIDDER.

SAFETY DEVICE FOR ELEVATORS.

No. 11,452. Reissued Nov. 13, 1894.

Witnesses:

Thos. E. Robertson

H. E. Clendaniel

Inventor

Willington P. Kidder

By T. W. Robertson his Attorney

2 Sheets—Sheet 2.

W. P. KIDDER.

SAFETY DEVICE FOR ELEVATORS.

No. 11,452. Reissued Nov. 13, 1894.

Witnesses:

Thos. E. Robertson

H. E. Clendaniel.

Inventor

Wellington P. Kidder

By T. J. W. Robertson his Attorney

UNITED STATES PATENT OFFICE.

WELLINGTON P. KIDDER, OF BOSTON, MASSACHUSETTS.

SAFETY DEVICE FOR ELEVATORS.

SPECIFICATION forming part of Reissued Letters Patent No. 11,452, dated November 13, 1894.

Original No. 525,420, dated September 4, 1894. Application for reissue filed October 20, 1894. Serial No. 526,523.

*To all whom it may concern:*

Be it known that I, WELLINGTON P. KIDDER, a citizen of the United States of America, residing at Boston, in the county of Suffolk, Massachusetts, have invented certain new and useful Improvements in Safety Devices for Elevators, of which the following is a specification, reference being had therein to the accompanying drawings.

This invention is designed as an improvement upon the apparatus shown in my Patent No. 495,094, issued April 11, 1893, and is illustrated in the accompanying drawings, fully described in the following specification and then definitely claimed at the end hereof.

Figure 1:
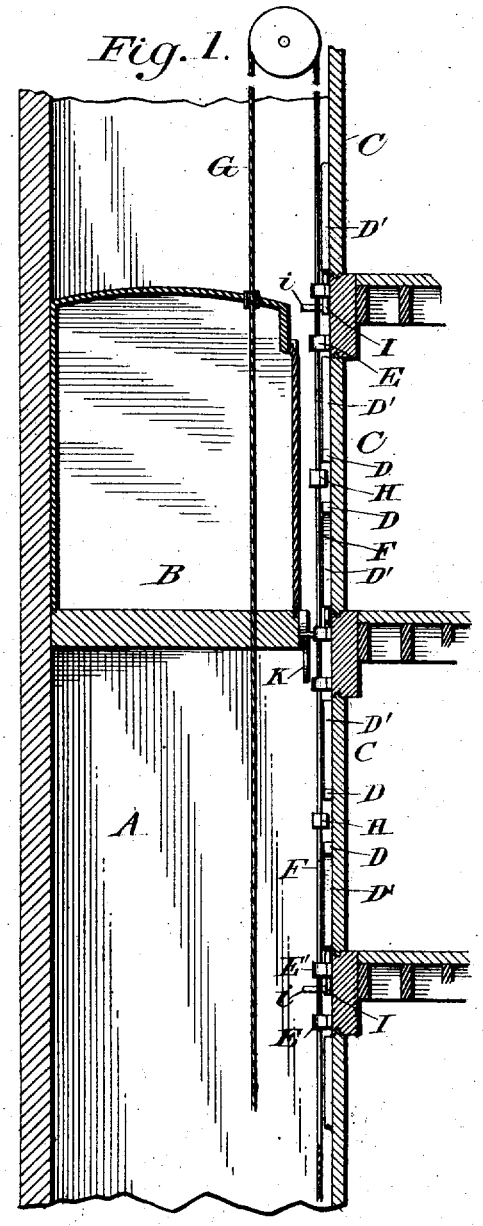
Figure 2:
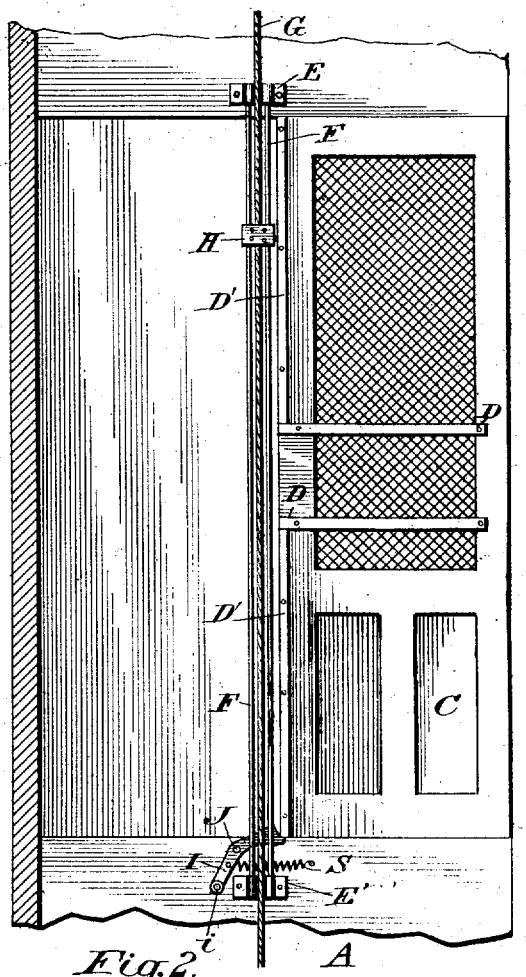
Figure 3:
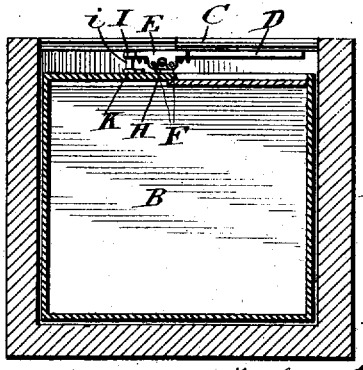
Figure 4:
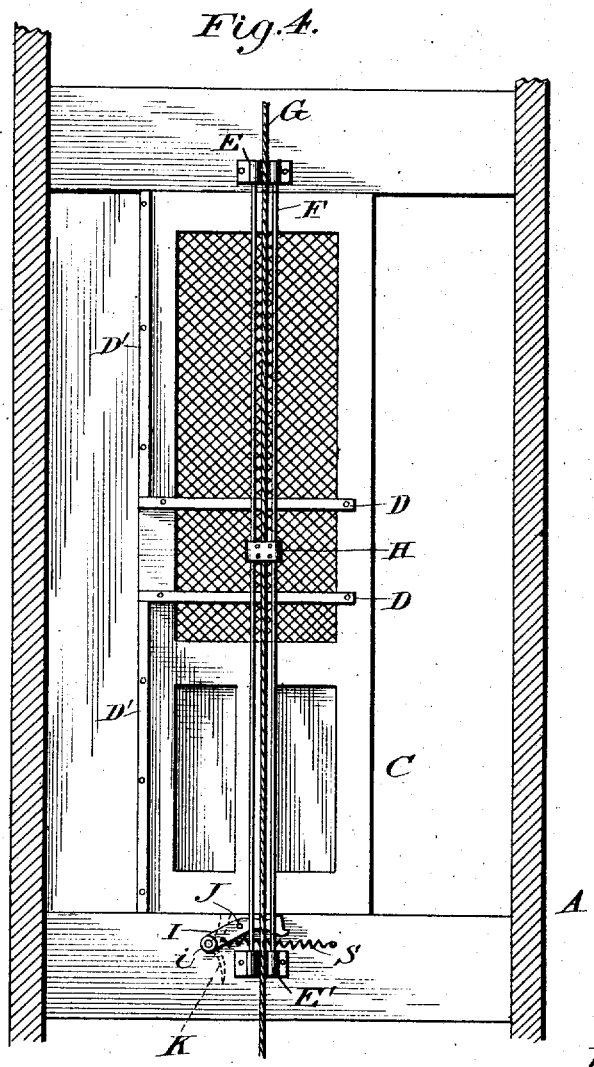
Figure 5:
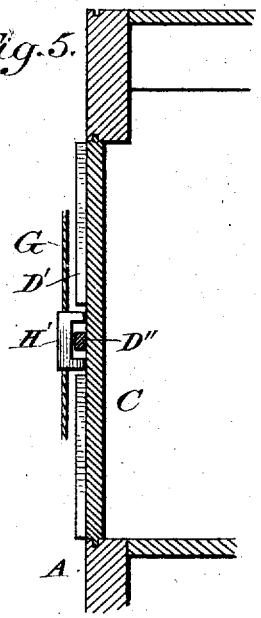
Figure 6:
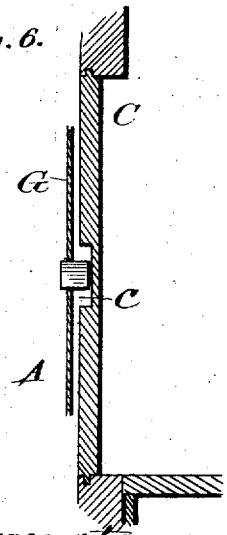
Figure 7:
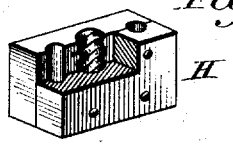

In the accompanying drawings—Figure 1 is a vertical section on a reduced scale of an elevator constructed according to my improvement. Fig. 2 is a similar section of part of the same at right angles to that shown in Fig. 1 looking toward the well door with said door closed. Fig. 3 is a sectional plan of the same. Fig. 4 is a section like Fig. 2 but with the well-door open. Figs. 5 and 6 are modifications. Fig. 7 is a detail of a stop.

Referring now to the details of the drawings by letter, A represents an elevator well and B the elevator car which may be raised or lowered by any suitable means, but as these means form no part of this invention it is unnecessary to describe them.

C C represent the doors of the well which may be of the ordinary form, but are provided with two horizontal bars D and two vertical bars D′, arranged as shown so as to leave considerable space between the horizontal bars. As these bars act as stops, and are on or form part of the door, I shall hereinafter call them "door stops."

E E′ represent brackets firmly secured to the wall of the well, carrying rods F, the upper ends of said rods being firmly secured in the bracket E and the other ends loosely held in the bracket E′ to allow of expansion and contraction.

At G is shown the rope for operating the valve, which rope I prefer to style a "controller" in the following claims, and on this rope is secured the rope stop H, sliding on the rods F, which stop is made in two parts bolted together as shown, so as to be securely held in the desired position on the rope. To hold this stop rigidly and prevent its slipping on the rope under any reasonable strain, I form a thread (like a screw thread) in the hole that receives the rope, as shown in Fig. 7.

Unless some means are provided for fastening the doors, those above and below the one at which the elevator has been stopped, may be opened, and thus accidents may occur. This of course may be prevented by a fastening accessible only to the elevator conductor, but this requires attention on his part. To avoid this I propose to use a latch I pivoted at J to the floor timbers or to the wall of the well between the doors, one arm of which latch catches under the lower corner of the door as shown in Fig. 2, in which condition the latch holds the door closed and the latter cannot be opened from either side, until the car B is at the right elevation before the door, when a curved bar or cam K secured to the car acts upon a roller *i* on the latch I and moves the latch so as to allow the door to open as shown in Fig. 3.

By arranging the latches between the doors as shown, no special catch or pin is required for the latch to catch on, as the upper end of the latch engages with the stop at the corner of the door and hence no pin or other additional holding device is required, and therefore there is no danger of said pin or catch becoming loose or breaking, as the stop is necessarily secured strongly in its position, while a pin or similar catch is apt to be but poorly secured to the door. Moreover, the location of the latch between the doors has the advantage of being more out of reach of mischievous boys, who might be able to reach the latch with a stick through the lattice of the door when arranged in more accessible places.

The operation of my stop device is very similar to that shown in my previous patent and will be easily understood. When the car has been brought to a position of rest before a door, the rope stop H is on a line with the center of the space between the door stops D′, and thus said door stops form no impediment to the opening of the door, and as the latch I is held below the door by the cam K, said door can be readily opened as shown in Fig. 4. When the door is opened it is obvious that the car cannot be started as any attempt to move the rope sufficiently to start the car would bring the rope stop H in contact with one or the other of the horizontal door stops D′ so that the conductor is compelled to shut the door before he attempts to start the car. As soon, however, as the door is shut, the rope may be moved to start the car and this will carry the rope stops above or below the space between the horizontal door stops D′, in which condition of the rope and its stops the doors cannot be opened, as one or the other of the vertical door stops D would come in contact with the rope stop opposite it.

As soon as the doors are closed and the car moves, the latch I returns to its position against the corner of the door and securely holds the same closed until such time as the car again approaches the door. This latch may be returned to its position by its own gravity, but I prefer to employ a spring S to assist its motion.

I do not wish to limit myself to the use of the door stops shown, as it is evident that instead of the four bars shown, three bars, two vertical and one horizontal, may be used—the rope stop having a notch or recess to allow of the horizontal door stop sliding through it, as indicated in Fig. 5 in which C indicates the door of the well, D″ the horizontal door stop, D′ the vertical door stops, G the rope and H′ the rope stop.

In some cases the door may be provided with a wide groove *c* as shown in Fig. 6 to receive the rope stop when the door is being opened, in which case no projecting stops would be necessary, as the edge of the door would come in contact with the rope stop, and thus act as a stop, if the rope stop were above or below the groove as indicated in dotted lines; and as the rope stop projects into the groove when the door is open, said stop would come in contact with the top or bottom edge of the groove, should any attempt be made to start the car, said upper and lower edges of the groove thus forming stops to prevent sufficient movement of the rope to start the car.

The above constructions have an advantage over that shown in my previous patent above referred to in some situations, and especially for use with a basement door, when there would not be room for the stop on the rope to go below the floor.

In the above construction there is no necessity for the stop going below the bottom of the door, and hence this improvement could be used where that described in my previous patent could not.

I have shown two rods on which the rope stop slides, but it is evident that a single polygonal, or a round grooved rod, may be used instead of the two rods F; or the stop may slide in a groove in the wall of the elevator well. These and other changes may be made without departing from the spirit of my invention.

What I claim as new is—

1. The combination in an elevator and with the car and the controller thereof, of stops connected to and moving with said controller, and sliding doors closing the entrance to the well, provided with vertical stops constructed to engage with the stops on the controller for the major part of the length of said doors, said stops having a substantially central opening between them to allow the door stops to pass the controller stop, as set forth.

2. The combination in an elevator and with the car and the controller thereof, of a stop connected to and moving with said controller, and a sliding door closing the entrance to the well and provided with a horizontal stop engaging with the stop on the controller to prevent the full motion of the same when said door is open, substantially as described.

3. The combination in an elevator and with the car and the controller thereof, of a stop connected to and moving with said controller, and a sliding door closing the entrance to the well provided with a vertical stop engaging with the stop on the controller and constructed and arranged to prevent the opening of the door when the car is in motion, substantially as described.

4. The combination in an elevator and with the car and the controller thereof, of a stop mounted on said controller, a sliding door closing the entrance to the well, the vertical stops D and the horizontal stops D′, both vertical and horizontal stops being secured to the door, substantially as shown and described.

In testimony whereof I affix my signature, in presence of two witnesses, this 1st day of October, 1894.

WELLINGTON P. KIDDER.

Witnesses:
GEO. H. ABBOTT,
J. ALFRED ANDERSON.